April 5, 1955 E. C. MORPHET 2,705,551
AUTOMATIC BRAKE CONTROL
Filed May 20, 1950 2 Sheets-Sheet 1

INVENTOR.
Everett C. Morphet
BY
ATTORNEY

April 5, 1955  E. C. MORPHET  2,705,551
AUTOMATIC BRAKE CONTROL
Filed May 20, 1950  2 Sheets-Sheet 2

INVENTOR.
Everett C. Morphet
BY
Jess M. Roberts
ATTORNEY

United States Patent Office 2,705,551
Patented Apr. 5, 1955

2,705,551

AUTOMATIC BRAKE CONTROL

Everett Charles Morphet, Los Angeles, Calif.

Application May 20, 1950, Serial No. 163,202

4 Claims. (Cl. 192—4)

My invention relates to automobile brakes with special reference to auxiliary brakes for parking as well as for emergency use when driving. Preferably the auxiliary brakes are operated by a left foot pedal alongside the usual right foot pedal that operates the main brakes.

The general object of the invention is to provide a latch for such an auxiliary brake that will hold and release the brake as required, and will do so in a more or less automatic manner with minimum attention and minimum manipulation by the driver. A further object is to provide a mode of operation of exceptional flexibility to meet the requirements of a number of different situations encountered in driving and parking an automobile. A special object in the preferred form of the invention is to provide safety against accidental release of the brake.

Broadly described, the latch mechanism is operatively associated with the transmission or gear shift of the car as well as with the accelerator or throttle and is also operatively associated with a suitable manual control. More specifically described, the latch mechanism responds to gear changes by going into and out of engagement automatically as the transmission is shifted into and out of neutral, and when the auxiliary brake is latched by the manual control it will ordinarily be released automatically in response to operation of the accelerator. In the preferred form of the invention the manual control may also be manipulated to lock the brake latch and at the same time lock the accelerator so that the driver cannot start the car without releasing the auxiliary brake. It is these various relationships that make the invention readily adaptable to the requirements of various situations, as will be explained.

The above objects and advantages of the invention together with other objects and advantages will be understood from the following detailed description of the invention taken with the accompanying drawings.

In the drawings, which are to be understood as merely illustrative:

Figure 1:
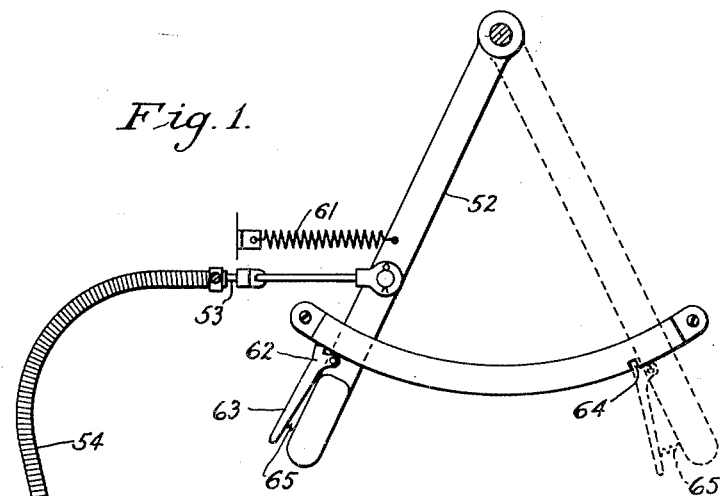
Figure 1 is a side elevation of a preferred embodiment of the invention incorporated in a typical automobile.
Figure 2:
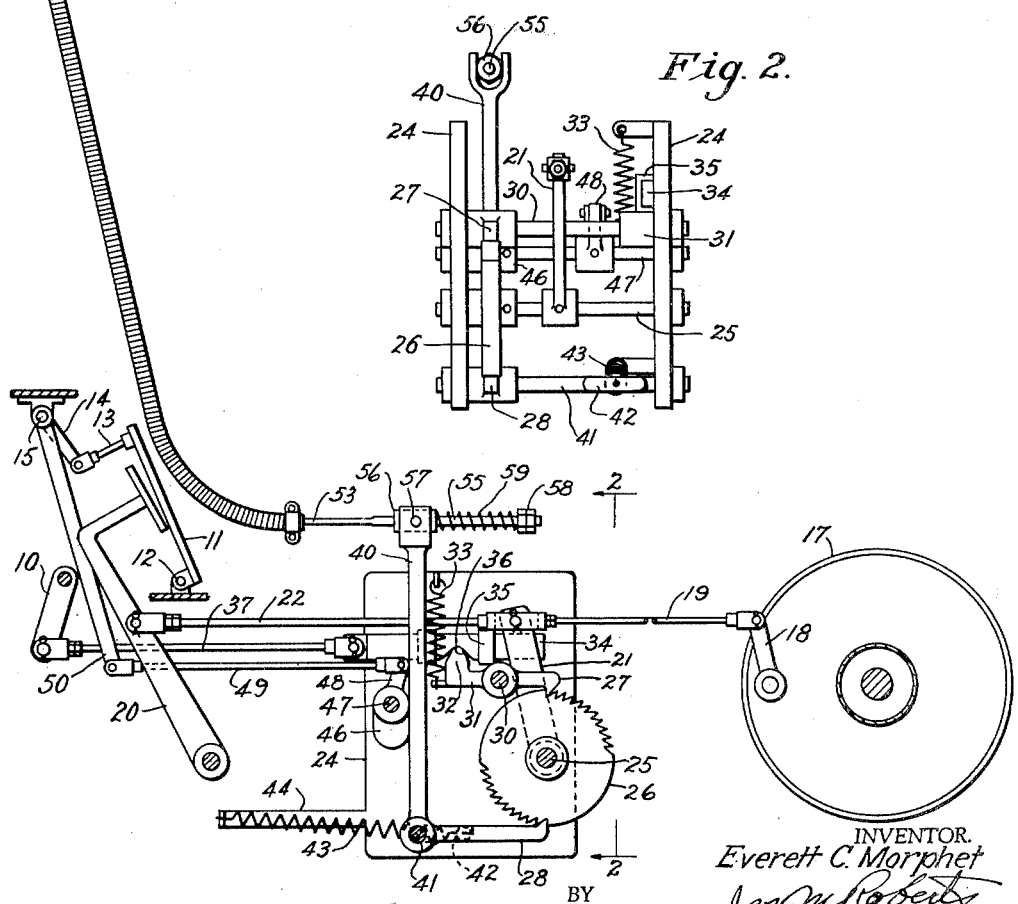
Figure 2 is a section taken on the line 2—2 of Figure 1 showing the latching mechanism in end elevation.

Figure 1 shows certain conventional parts of a typical automobile that are involved in the operation of my invention. One of these parts is an arm or lever 10 included in the gear shifting mechanism, which lever moves whenever the transmission is shifted into or out of neutral. Another conventional part in a typical automobile is an accelerator or throttle for the engine in the form of the usual foot pedal 11 mounted on a hinge 12. In a well known manner this pedal is connected by a link 13 to a rocker arm 14 for actuating an operating shaft 15, this shaft being in turn suitably linked to the carburetor. Also conventional is a brake 17 on each rear wheel, which includes an auxiliary brake mechanism represented by an operating arm 18, this arm being controlled by an operating rod 19. In the typical automobile this auxiliary brake is used for parking only.

Usually the brake operating rod 19 is actuated by a hand control that is within reach of the driver and may be latched for parking the automobile. In carrying out the present invention, however, I prefer to operate this auxiliary brake by a pedal 20 positioned for the left foot of the driver, which pedal may be the conventional clutch pedal of the automobile. Some cars do not have such clutch pedals, notably certain cars with so-called fluid drives, and in such instances a special left-foot brake pedal may be added for the purpose of the present invention.

Any suitable arrangement may be used for latching the auxiliary brake. In the present example, each of the previously mentioned brake rods 19 on the two sides of the car is operatively connected to a central rocker arm 21 for the purpose of latching the brake and this rocker arm in turn is operatively connected to the brake pedal 20 by a suitable rod 22.

It is contemplated that whatever latch mechanism is used for the auxiliary brake, it will be responsive to the gear shift mechanism represented by the lever 10 and also responsive to the accelerator pedal 11 as well as responsive to some suitable manual control. Various expedients may be employed for the three responsive relationships and the following specific structures selected for the purpose of disclosure will suggest to those skilled in the art other suitable mechanisms within the scope of my appended claims.

The latching mechanism includes two spaced frame members or side plates 24 under the car in which are journaled various operating shafts. One of these shafts 25 carries and is operated by the previously mentioned rocker arm 21 that swings whenever the brake pedal 20 is depressed to apply the auxiliary brakes. A ratchet wheel 26 is keyed to this same shaft 25 to rotate at the same time. Two pawls are provided for releasable engagement with the ratchet wheel 26, namely, an upper pawl 27 responsive to the transmission and a lower pawl 28 responsive to the accelerator pedal 11.

The upper pawl 27 is keyed to a shaft 30 which is actuated by a suitable arm 31 having a tapered control finger 32. A suitable spring 33 continuously pulls the arm 31 upward thereby pressing the control finger 32 against a cooperating control bar 34. The control bar 34, which is slidingly mounted in two suitable supports 35, has a recess 36 to receive the tapered control finger 32, the recess having sloping shoulders for sliding cooperation with the finger.

Figure 3:
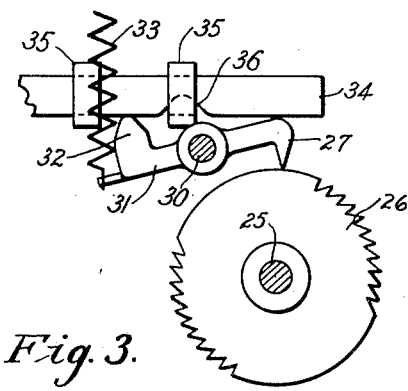
Figure 3 is a side elevation of the part of the latching mechanism that responds to the transmission, the mechanism being shown in released position.

The slidable control bar 34 is connected with the previously mentioned gear shift lever 10 by an operating rod 37 whereby the recess 36 registers with the tapered control finger 32 whenever the transmission is in neutral and moves out of register whenever the transmission is shifted out of neutral. Thus shifting the transmission into neutral permits the tapered control finger 32 to enter the recess 36 by the force of the spring 33 thereby causing the upper pawl 27 to swing into engagement with the teeth of the ratchet wheel 26, as shown in Figure 1. On the other hand, shifting the transmission out of neutral moves the control bar 34 longitudinally to force the control finger 32 out of the recess 36 with a cam action, thereby swinging the upper pawl 27 out of engagement with the teeth of the ratchet wheel 26, as shown in Figure 3.

Figure 5:
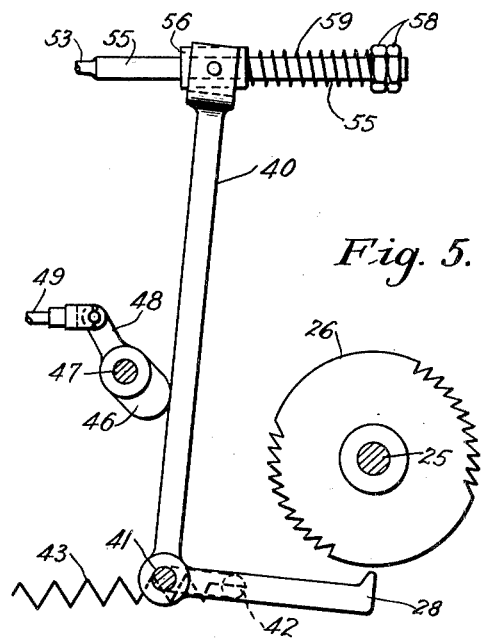
Figure 5 is a view similar to Figure 4 showing how a cam operated by the accelerator moves the latching mechanism to its normal released position.
Figure 4:
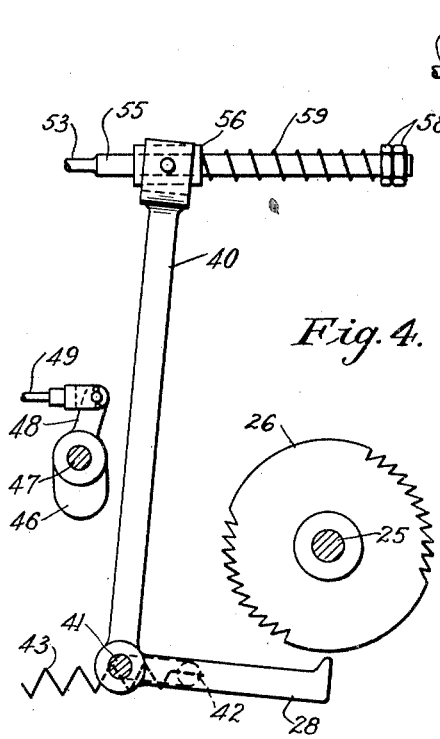
Figure 4 is a side elevation of the part of the latching mechanism that responds to the accelerator, the mechanism being shown in its normal released position.

The lower pawl 28 is preferably in the form of a bell crank having an upwardly extending arm 40 and preferably is adapted to move with a snap action between a position in engagement with the ratchet wheel 26 shown in Figure 1 and a second position spaced away from the ratchet wheel shown in Figure 5. To provide the snap action the pawl 28 is keyed to a shaft 41 that is formed with an off-set 42 to serve as a crank. A suitable spring 43 in tension between the crank 42 and a bracket 44 is positioned to swing across the center or axis of the shaft 41 as the lower pawl 28 moves into and out of engagement with the ratchet wheel 26. Thus the pawl 28 will snap into one or the other of its two positions and will tend to stay in whichever position it is placed.

The desired mechanical relationship between the lower pawl 28 and the accelerator pedal 11 may be achieved by providing a cam 46 on a cam shaft 47 to rotate against the bell crank arm 40. The cam action forces the pawl 28 away from the ratchet wheel 26 to a past-center point where the spring 43 with a snap action completes the movement of the pawl to its ineffective position spaced away from the ratchet wheel 26. Keyed to the cam shaft 47 is an actuating arm 48 controlled by the accelerator pedal 11. In the particular construction shown in the drawings the actuating arm 48 is connected by a rod 49 to a rocker arm 50 on the previously mentioned accelerator shaft 15. Thus depressing the pedal 11 to accelerate the engine may automatically disengage the pawl 28 from the ratchet wheel 26 to release the auxiliary brake.

The desired manual control may include a hand lever 52 within convenient reach of the driver. Suitably attached to this hand lever is a flexible cable 53 in a flexible sheath 54. At its lower end the cable 53 is operatively connected with the bell crank arm 40 in any suitable manner. The drawings show the cable 53 connected to a rod 55 that slides in a sleeve 56, the sleeve being mounted by a pair of pivots 57 in the forked upper end of the bell crank arm 40. The outer end of the rod 55 has an enlargement in the form of a pair of nuts 58 to act against the outer end of the sleeve 56, a suitable coiled spring 59 being interposed to cushion the action.

The hand lever 52 may simply hang free but I prefer to provide a suitable coiled spring 61 tending to hold the hand lever in a forward position that permits the lower pawl 28 to engage the ratchet wheel 26 as shown in Figure 1.

I also prefer to provide suitable means for locking the hand lever 52 in a second position shown in dotted lines in Figure 1. For this purpose a latch member 62 with a handle 63 may be pivotally mounted on the hand lever 52 for releasable engagement with a notch 64 in a curved bar, such an arrangement being well known. A small spring 65 acting in compression tends to hold the latch member 62 in its engaged position.

Figure 6:
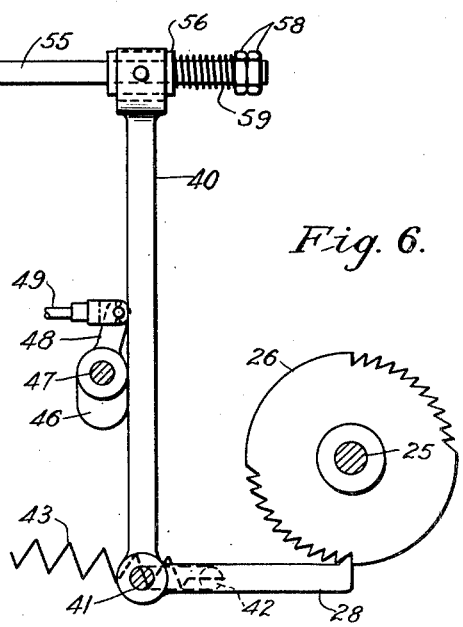
Figure 6 is a similar view showing the latch mechanism locked in engaged position by the manual control thereby blocking operation of the accelerator.

When the hand lever 52 is in the dotted locked position the two nuts 58 on the end of the slide rod 55 are close enough to the sleeve 56 to prevent unlatching movement of the bell crank arm 40, as shown in Figure 6, and since the cam 46 lies against the bell crank arm the locked hand lever not only prevents release of the auxiliary brake but also prevents operation of the accelerator pedal 11. Thus when the driver attempts to start or accelerate the engine the rigidity of the accelerator pedal 11 reminds him and forces him to release the auxiliary brake by moving the hand lever 52 forward from its locked position.

Operation

The operation of my invention may be readily understood from the foregoing description.

In normal driving the auxiliary brake may be used in any emergency by simply depressing the left brake pedal 20 in addition to pressing down on the usual right foot brake pedal. This emergency action is natural for the average driver long accustomed to depressing the clutch pedal with the left foot for stopping the car. Under such circumstances no latching action takes place when the auxiliary brake is applied so the auxiliary brake is released as soon as the foot pressure is removed.

For bringing the latch mechanism into effect to hold the car on a hill when a stop is necessary with the engine running, either of two procedures may be employed. One procedure is to shift the transmission to neutral and depress the brake pedal 20. Applying the auxiliary brake swings the arm 21 to rotate the ratchet wheel 26 counter-clockwise, as viewed in Figure 1, and with the transmission in neutral, the control bar recess 36 registers with the control finger 32 to permit the spring 33 to swing the upper pawl 27 into engagement with the ratchet wheel. The driver may then relax his pressure on both brake pedals. To resume travel the driver, using his right foot to apply the main brakes, shifts the transmission out of neutral thereby causing the sloping shoulders of the recess 36 to displace the control finger 32. This action swings the pawl 27 away from the ratchet wheel 26 to release the auxiliary brake in an automatic manner.

The second procedure for using the invention as a "hill-holder" is to push down the auxiliary brake pedal 20 and then pull the hand lever 52 far enough rearward to throw the lower pawl 28 past center so that spring 43 will snap the pawl into engagement with the ratchet wheel 26. The hand lever 52 is then released for the spring 61 to return it to its normal forward position shown in Figure 1. When the driver later depresses the accelerator pedal 11 to resume travel, the cam 46 acting against the bell crank arm 40 swings the lower pawl 28 past center far enough for the spring 43 to snap the pawl to its normal position away from the ratchet wheel 26.

For ordinary parking the transmission may be shifted to neutral and the left brake pedal 20 depressed to bring the upper pawl 27 into engagement with the ratchet wheel as heretofore described. The auxiliary brake will then be released automatically when the transmission is shifted out of neutral.

Another parking procedure is to depress brake pedal 20 and swing the hand lever 52 back and forward again as heretofore described to throw the lower pawl 28 past center to snap into engagement with the ratchet wheel. Pressing down on the accelerator pedal 11 to start the car automatically swings the pawl 28 out of engagement by the previously described cam action.

For double-latching the parking brake, the driver may combine both of these arking procedures by depressing brake pedal 20 and not only putting the transmission in neutral but also swinging the hand lever 52 back and forward. Both pawls will then engage the ratchet wheel and pawl 27 will later disengage when the car is again shifted out of neutral and pawl 28 will disengage as soon as the driver steps on the accelerator pedal to start the car.

In some instances, especially when parking on a steep grade, it is desirable not only to use the auxiliary brake but also to put the car in gear so that the transmission may help prevent movement of the parked car. Since the transmission is not in neutral upper pawl 27 cannot be used to latch the auxiliary brake but the lower pawl 28 may be snapped into engagement with the ratchet wheel 26 by simply swinging the hand lever 52 back and forward, as heretofore explained.

A special safety feature of the described form of my invention is the further precautions it provides against accidental release of the auxiliary brake. This feature is most important when children are in the parked car, many accidents being caused by youngsters meddling with car controls.

For such safety parking, the auxiliary brake pedal 20 is depressed and the transmission is shifted to neutral to cause upper latch 27 to engage the ratchet wheel 26. Then the driver pulls the hand lever 52 all the way back to lock it with its latch member 62 engaged in the notch or locking recess 64. The lower pawl 28 is then locked in place by the cable controlled rod 55 as shown in Figure 6.

There is a high degree of safety against accidents because the auxiliary brake will not release until three different control manipulations are carried out. The transmission must be shifted out of neutral; the hand lever 52 must be unlocked and swung forward; and the accelerator pedal must be placed under foot pressure. It is, to be noted, too that performing these three acts in just any sequence will not release the brakes, because the foot pressure against the accelerator pedal 11 is effective only after the hand lever 52 is unlocked. Even then the auxiliary brake will stay latched if the transmission has in the meantime been returned to neutral by the experimenting child.

The same degree of safety against meddling can also be had when the car is parked in gear. When the driver applies the auxiliary brake and then locks the hand lever 52 three manipulations are required to release the car for movement and even then shifting gears into neutral before unlocking the hand lever 52 causes the upper pawl to engage the ratchet wheel thereby still leaving three manipulations necessary to free the car for movement.

Having described my invention, I claim:

1. In an automotive vehicle having a transmission adjustable to a neutral position, the combination therewith of: a brake; a foot pedal to operate said brake; a first mechanical latch to latch said brake automatically whenever the brake is applied while said transmission is in said neutral position; means to release said first latch automatically in response to shift of said transmission out of neutral; a second mechanical latch movable from an ineffective position to an effective position to latch the same brake independently of said first latch whereby the brake may be latched while the transmission is out of neutral with the engine running and whereby the transmission may operatively connect the engine of the vehicle with the vehicle wheels while the engine is dead to cause a dead engine to add its braking effect to the braking effect of the latched brake; spring means normally holding said second latch in its ineffective position; and means within convenient reach of the driver of the vehicle operable by hand to move said second latch to its effective position.

2. A combination as set forth in claim 1 in which said hand operable means is movable from an ineffective position to an effective position to hold said second latch in its effective position, and which includes manually releasable means to hold said manually operable means at its effective position.

3. A combination as set forth in claim 2 in which said automotive vehicle has an accelerator and in which said second latch in moving from its ineffective position to its effective position moves over center with respect to said spring means whereby the spring means will tend to hold said second latch in either of its two positions; and in which means operatively connected to the accelerator of the vehicle automatically shifts said second latch from its effective position to its ineffective position in response to operation of the accelerator.

4. In an automotive vehicle having a transmission adjustable to a neutral position, the combination therewith of: a brake; a foot pedal to operate said brake; a first mechanical latch to latch said brake automatically whenever the brake is applied while said transmission is in said neutral position; means to release said first latch automatically in response to shift of said transmission out of neutral; a second hand operated mechanical latch to latch the same brake independently of said first latch whereby the brake may be manually latched while the transmission is out of neutral with the engine running and whereby the transmission may operatively connect the engine of the vehicle with the vehicle wheels while the engine is dead to cause the dead engine to add its braking effect to the braking effect of the latched brake; said combination further includes a rotary ratchet member operatively connected with said brake and in which said two latches are adjacent the periphery of the rotary latch member for releasable engagement therewith.

References Cited in the file of this patent

UNITED STATES PATENTS

| | | |
|---|---|---|
| 1,906,699 | Mallison | May 2, 1922 |
| 2,010,628 | Duecy | Aug. 6, 1935 |
| 2,140,780 | Wimmer | Dec. 20, 1938 |
| 2,152,084 | Paine | Mar. 28, 1939 |
| 2,229,056 | Dick | Jan. 21, 1941 |
| 2,233,323 | Nicol | Feb. 25, 1941 |
| 2,241,407 | Leberatoscioli | May 13, 1941 |
| 2,248,747 | Dick | July 8, 1941 |
| 2,262,842 | Goepfrich | Nov. 18, 1941 |
| 2,308,822 | Murphy | Jan. 19, 1943 |
| 2,499,276 | Mullins | Feb. 28, 1950 |